May 15, 1962     M. T. KUZENKO     3,034,713
COURSE AND BEARING COMPUTER
Filed June 12, 1958     3 Sheets-Sheet 1

INVENTOR.
Michael T. Kuzenko
BY Norman N. Popper
ATTORNEY

May 15, 1962

M. T. KUZENKO 3,034,713

COURSE AND BEARING COMPUTER

Filed June 12, 1958

INVENTOR.
Michael T. Kuzenko
BY
Norman N. Popper
ATTORNEY

May 15, 1962  M. T. KUZENKO  3,034,713
COURSE AND BEARING COMPUTER
Filed June 12, 1958  3 Sheets-Sheet 3

INVENTOR.
Michael T. Kuzenko
BY
Norman N. Popper
ATTORNEY 3,034,713
COURSE AND BEARING COMPUTER
Michael T. Kuzenko, 20 Secatogue Lane E.,
West Islip, N.Y.
Filed June 12, 1958, Ser. No. 741,616
4 Claims. (Cl. 235—78)

My invention relates generally to course and bearing computers and specifically to a course and bearing computer for aerial navigation comprising a plurality of cooperative and corelated scales impressed on transparent members which rotate about a common axis.

One object of my invention is to provide a course and bearing computer from which a true course and its reciprocal may be determined directly from a course plotted on a map.

Another object of my invention is to provide a course and bearing computer from which a magnetic course and its reciprocal may be determined directly from a course plotted on a map.

A further object of my invention is to provide a course and bearing computer from which the position of an aircraft may be determined by means of bearings taken with a radio compass.

Still another object of my invention is to provide a course and bearing computer from which the degree and direction of the shortest turn to intercept a given course may be determined.

Yet another object of my invention is to provide a course and bearing computer which may be used to facilitate entering the traffic pattern and the downwind leg in preparation for landing.

A further object of my invention is to provide a course and bearing computer which may be used to facilitate the location of the active runway after receipt of taxi instructions.

Another object of my invention is to provide a course and bearing computer which may be used to ascertain aircraft-station and course relationship in beaming bracketing, procedure turns, and interception of given courses at predetermined angles problems.

Still another object of my invention is to provide a course and bearing computer which may facilitate bisecting the quadrant in low frequency range orientation problems.

A further object of my invention is to provide a course and bearing computer which may be used for known beam bracketing problems to ascertain the proper heading to a station whose beam heading is known.

Yet another object of my invention is to provide a course and bearing computer for use in unknown beam bracketing problems by the 180° true fade method of orientation.

Still another object of my invention is to provide a course and bearing computer which may facilitate radio bearing procedure by use of the automatic direction finder.

Yet a further object of my invention is to provide a course and bearing computer to facilitate the interception of a predetermined course relative to radio bearing of a station near an airport.

Still a further object of my invention is to provide a course and bearing computer to facilitate the making of drift corrections and homing on a known beam, as well as making good a track away from the station.

Another object of my invention is to provide a course and bearing computer to facilitate drift corrections on a track or predetermined heading to be made good.

A further object of my invention is to provide a course and bearing computer to facilitate the solution of time-distance problems with the use of omnirange.

Another object of my invention is to provide a course and bearing computer to facilitate a "steer" from an airport to an aircraft wishing to land on a particular runway.

Yet another object of my invention is to provide a course and bearing computer to facilitate flying a predetermined course with the aid of an omniscope.

These objects and advantages as well as other objects and advantages may be obtained by use of the device illustrated in the drawings in which.

Figure 1:
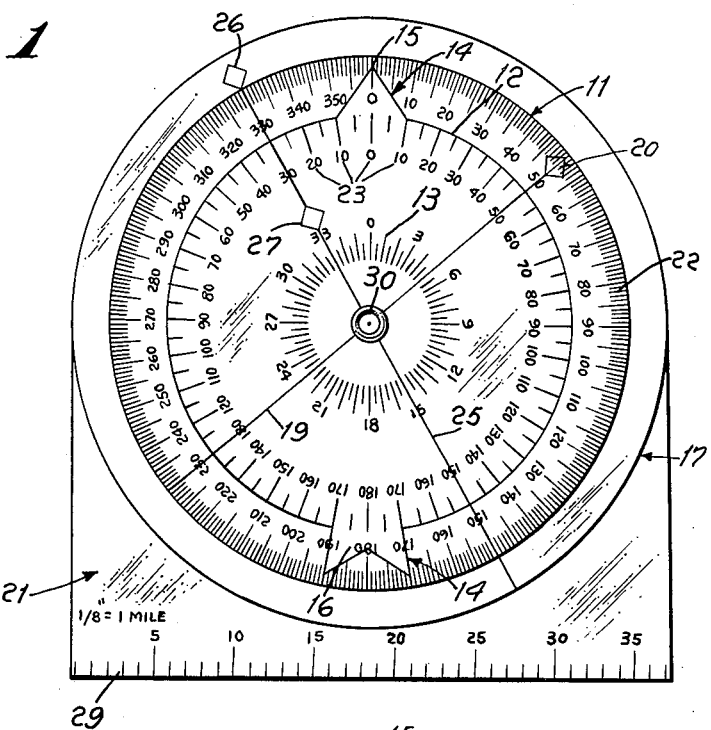
FIGURE 1 is a top plan view of the completely assembled course and bearing computer.
Figure 2:
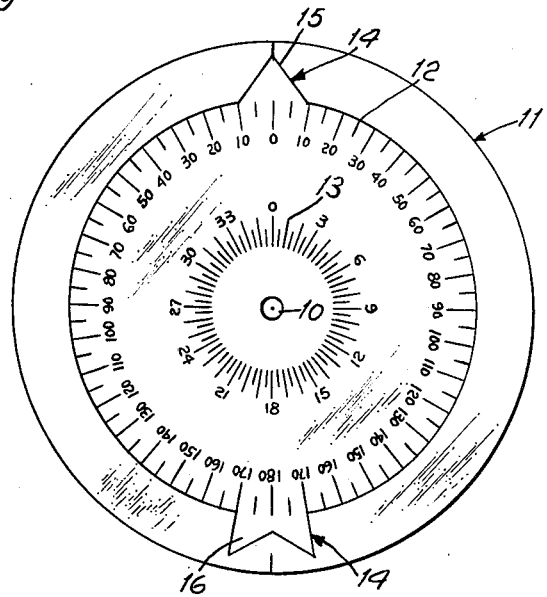
FIGURE 2 is a top plan view of the topmost disc of the course and bearing computer.
Figure 3:
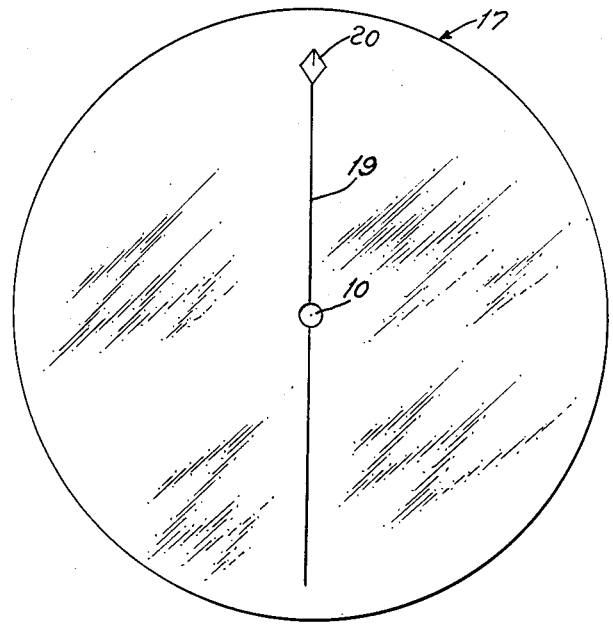
FIGURE 3 is a top plan view of the intermediate disc immediately underlying the topmost disc.
Figure 4:
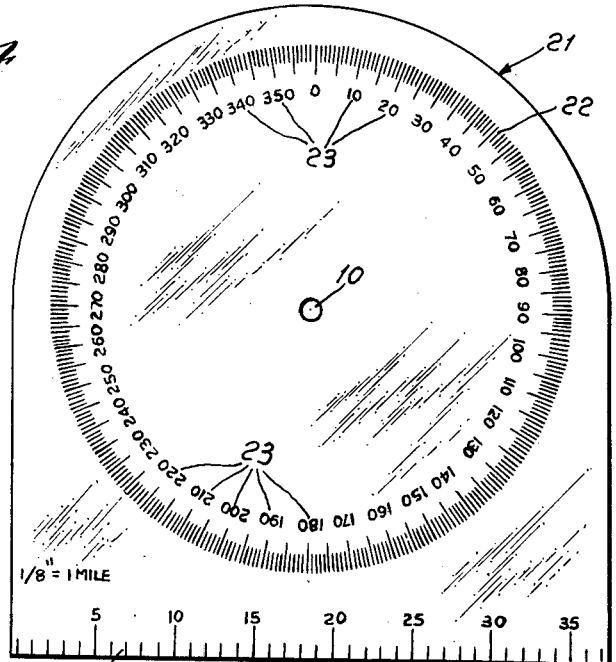
FIGURE 4 is a top plan view of the base plate underlying the two top discs.
Figure 5:
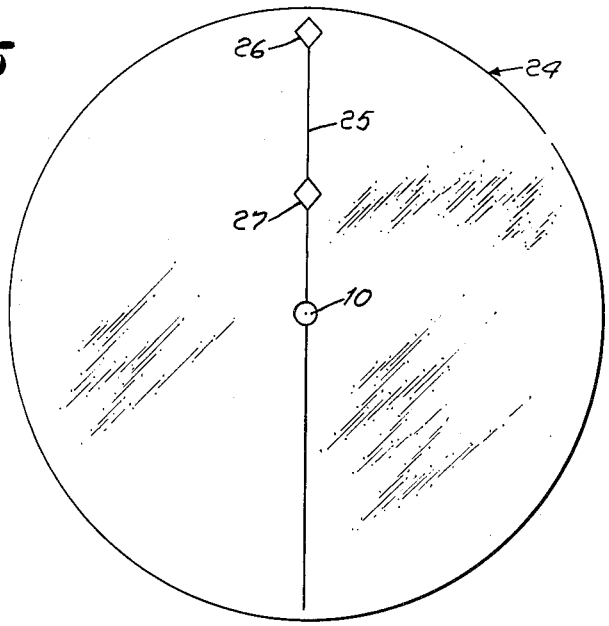
FIGURE 5 is a top plan view of the bottom disc underlying the base plate.
Figure 6:
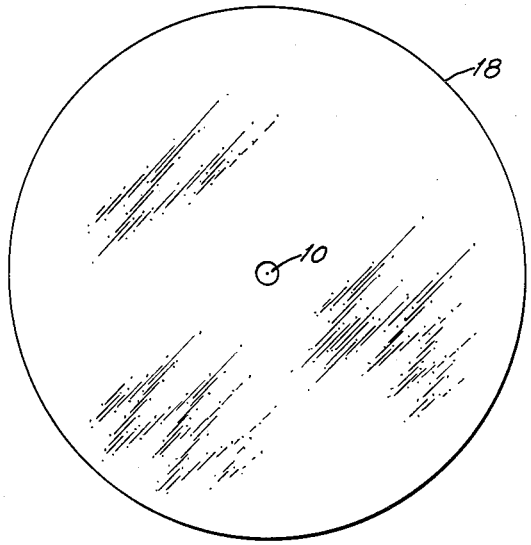
FIGURE 6 is a top plan view of a separator disc which is interposed between the discs and between the discs and base plate.

Referring now to the drawings in detail, my course and bearing computer is comprised of a plurality of transparent discs on which are printed various scales. The discs may rotate independently of each other about a common axis 10. The topmost transparent disc 11 has imprinted on it a circular scale 12 depicting degrees of arc from 0° to 180° in both a clockwise and a counter-clockwise direction. A second circular scale 13 is imprinted on the disc 11 concentric with the first scale and which depicts degrees of arc from 0° to 360° in a clockwise direction. The 0° marks on both scales 12 and 13 are aligned with one another on a radius from the center of rotation of the disc. An arrow 14 is also imprinted on the disc 11, with its tip 15 aligned with the 0° mark on both of the circular scales 12 and 13, on a radius from the center of rotation 10 of the disc 11. The tail 16 of the arrow 14 conversely terminates at the 180° mark on both scales 12 and 13. In addition, both the head 15 and the tail 16 of the arrow 14 extend beyond the periphery of the first scale 12.

Immediately beneath the topmost disc 11 is a transparent intermediate disc 17 which may rotate independently of the topmost disc 11 about a common center of rotation 10. Interposed between the topmost disc 11 and the intermediate disc 17 is a transparent separator disc 18 which is rotatable about the common axis of rotation 10. The separator disc 18 mechanically facilitates the independent rotation of the topmost disc 11 and the intermediate disc 17. Imprinted on the intermediate disc 17 is a single line 19 which extends through the axis of rotation 10 and terminates at one end in a diamond 20.

Underlying the intermediate disc 17 is a transparent base plate 21. Interposed between the intermediate disc 17 and the base plate 21 is a second transparent separator disc 18 which is rotatable about the common axis 10. This separator disc 18 similarly facilitates the independent rotation of the intermediate disc 17 and the base plate 21. Imprinted on the base plate 21 is a circular scale 22 concentric with the common axis of rotation 10 and depicting degrees of arc from 0° to 360° in a clockwise direction. The periphery of the scale 22 is coincident with the tip 15 of the arrow 14 imprinted on the topmost disc 11, and is also coincident with the tip of the diamond 20 imprinted on the intermediate disc 17. The numerals 23 of the scale 22 on the base plate 21 lie within the periphery of the scale 22 but beyond the periphery of the scale 12 on the topmost disc 11. Since both the topmost and intermediate discs 11 and 17 are transparent as are the separator discs 18—18 and the base plate 21, each of the scales 12, 13 and 22 may be seen concentrically radiating from a common center of rotation 10. In addition, the diamond 20 on the intermediate disc 17 and the tip 15 and the tail 16 of the arrow 14 on the disc 11 point to the periphery of the scale 22 imprinted on the base plate 21. The line 19 imprinted on the intermediate disc 17 may be seen passing through the axis of rotation 10 with its ends terminating at the periphery of the scale 22 on the base plate 21.

Underlying the base plate 21 is a transparent bottom disc 24 rotatable about the common axis of rotation. A third transparent separator disc 18 is interposed between the bottom disc 24 and the base plate 21 to mechanically facilitate their independent rotation. Imprinted on the bottom disc 24 is a line 25 which passes through the common axis of rotation 10. On one side, the line terminates in a diamond 26 which points to the periphery of the scale 22 on the base plate 21. A second diamond 27 lies on the line 25 on the same side of the axis of rotation 10 as the diamond 26 and points to the periphery of the scale 13 on the topmost disc 11. Since all of the elements of the computer are transparent, the various scales, diamonds, and arrow may be seen superimposed upon one another.

One side of the base plate 21 is a straight edge 28 on which is imprinted a linear scale 29 for measuring distances on a map. Any convenient device such as the rivet 30 may be employed to secure the discs and base plate together in an independently rotatable fashion.

My computer may be used in many different ways to solve or facilitate the solution of numerous different navigational problems. It is convenient to differentiate the two diamonds 26 and 27 lying on line 25 from the diamond 20 lying on line 19. Therefore, in the description of the use of my computer, I have designated the diamonds 26 and 27 as red diamonds and diamond 20 as a black diamond. Similarly, line 25 is red and line 19 is black.

*Example I.—True Course*

To measure the true course, the computer will be held with North at its top and the red diamond, at its 0° index, will be placed parallel to the North-South meridian on the aeronautical chart being used. Rotate the arrow and black diamond together until in line with the plotted true course. At the head of the arrow, read the number of degrees to the objective and at the tail of the arrow, read the reciprocal or return course.

*Example II.—Magnetic Course*

To measure the magnetic course, ascertain the variation from the aeronautical chart and place the red diamond opposite the number of degrees of variation (add westerly and subtract easterly). With the radial line, which extends from the red diamond, placed parallel to the North-South meridian, the hole in the center of the computer will be placed over the point of departure. Rotate the arrow to the plotted course. At the head of the arrow, read the magnetic course to the objective; at the tail of the arrow, read the reciprocal or return course.

*Example III.—Radio Fixes and Bearing Plotting*

The arrow and black diamond will be used together. Move the arrow so that it points to the actual aircraft heading on plate 21. On the red compass base, place the inner diamond to correspond with the radio bearing received. On the outer scale of the base plate and at the outer red diamond, read the bearing to the station. At the opposite end of the red reference line on the base plate, the heading from the station to the airplane will be found. Fly the diamond and plot the reciprocal. When several bearings are taken, the arrow is held constant and the red diamond is moved to the corresponding bearings and the headings noted. The time of bearings should be used to correct the bearings to form a one-time fix. This will establish the fix. By correcting for meridian convergence 0.6° for each degree of latitude and the difference in variation between the airplane and the station, a more accurate fix may be obtained. By subtracting or adding the variation and convergence, correct the heading of the aircraft for the difference between the station and the airplane. (NOTE.—When the airplane is west of the station, add the difference in convergence between the station and the airplane to the aircraft heading. In the United States, this is also true for the difference in variation.)

*Example.*—The airplane compass heading is 25°. At station #1 the radio compass bearing was 250°; at #2, 45°; at #3, 160°. Place the zero index of the arrow on the computer at the 25° heading on plate C. Now rotate the red diamond to correspond with the airplane bearings on the inner dial of disc 11 and plot the reciprocals on the dial of the base plate. Bearings: #1, .095°; #2, 250°; #3, .005°.

*Example IV.—Timed Turns*

On the outer scale of disc 11, the scale is graduated both ways from the zero index (at the arrow) to 180°. This will represent the number of degrees to turn. If a standard rate turn is used, .003° per second, a 30° turn would be of 10 seconds' duration. Divide the number of degrees required to turn by 3 for the time a standard rate turn would be held.

*Example.*—The aircraft is flying North and a turn to 280° is required. On the computer, place the zero index of the arrow and the black diamond at North. Opposite 280°, on the outer scale of disc 11, will be found 80°. The shortest distance to turn will be to the left for 27 seconds.

*Example V.—Aircraft Relationship to the Runway*

Place the outer red diamond at the degree on the base plate which represents the runway heading. The airplane and black diamond will be used together. The degree or angle of interception on the outer scale of disc 11 will be placed at the red line which extends from the red diamonds. Now, the heading to intercept may be read at the head of the arrow.

*Example.*—The runway to be used is number 6. The aircraft is to be flown at a 45° angle to the downwind leg. (NOTE.—Runways are marked in two digits only; therefore, 6 would be 60° magnetic and 24 would be 240° magnetic.) The downwind leg would be 240°. Rotate the arrow until 45° is at the red reference line. At the head of the arrow read the heading to intercept, 195°.

*Example VI.—Aircraft and Course Interception and Relationship*

On the compass rose of plate 21, set the black diamond on the course to be intercepted. Rotate the red diamond to the heading indicated by the aircraft compass. Move the arrow to the heading indicated at the red diamond. This is the aircraft and course relationship. For interception, rotate the arrow until the desired degree of angle of interception on the outer scale of disc 11 is lined with the black radial. At the head of the arrow will be found the new heading and direction to turn and on the outer scale of disc 11 at the red radial, the degrees to turn.

*Example.*—The airplane heading is 50° and the course to be intercepted is 210°. The angle of interception will be 45°. Set the black diamond at 210° on the compass rose of plate 21. The red diamond is placed opposite the 50° index. The arrow is moved to this heading. This is the aircraft and course relationship. With the red and black diamonds held at their respective headings, the arrow is turned to the desired angle of interception, 45°, by setting the 45° index of disc 11 on the black radial. At the head of the arrow will be found the direction to turn and the heading to intercept, 165°. On the outer scale of disc 11 at the red radial will be found the degrees to turn to intercept which, when divided by three, will provide the time a standard rate turn is to be made.

Example VII.—Known Beam Bracketing

When the beam heading is known, the right edge, corrected for wind, is the desired course to be flown either to the station or to some point of reference along the route. The limits of the brackets will be 30° to each side of the course. A wind one-half of the airspeed, at right angles to the course, will produce a drift angle of no more than 30°. The bracket limits will form a 60° angle. The course, corrected for wind, will be found at some point in this angle. Upon receiving the proper signals, the angle will be reduced until the desired course can be maintained.

With the use of the computer, the headings to which to turn and the amount of turn and direction can be found without difficulty. In working the following problem, by introducing the proper signals, the complex problem becomes one of simplicity.

*Example.*—The desired course is 240° to the station and the aircraft heading is 180°. Move the arrow to the 180° heading on plate 21 and set the black diamond opposite the course to be made good, 240°. Place the red diamond at the heading which is 30° less than the course, 210°. The first turn to the right is a 30-degree standard rate turn of 10 seconds' duration; the next turn is 30° beyond to 270°; thus, the complete angle is 60° and a turn of 20 seconds' duration. The red diamond, used as a reference to the last headings, is now moved to the 270° point. When the Off-Course signal is heard, a 50° turn to the left of 17 seconds' duration is made to the 220° heading. Move the red diamond to 220°. Upon receiving the proper signal, a 40° turn to the right of 13 seconds' duration is made to the new heading of 260°. This is repeated until the heading holds good, the angle being reduced by 10° each time. The difference in degrees between the inbound heading and the course made good will be the drift angle.

Example VIII.—Unknown Beam Bracketing as Used With the 180° True Fade Method of Orientation After the fade or build has been established, the average bisector is flow inbound. This heading will be held until the On-Course has been intercepted and the opposite quadrant signal is heard, at which time a turn to the left, not to exceed 180°, will be made. These two headings will be the bracket limits. When the proper signal has been received, the amount of turn reduced by 25% will be made in the opposite direction. This is repeated until the particular range leg is identified. This problem in the past has been very complex because of the mathematics involved; however, with the use of the computer, the direction of turning, the amount and the heading can be solved with the application of simple mathematics.

*Example.*—The inbound bisector heading is 180°. The beam heading is unknown (for the purpose of this problem, we shall assume the beam heading to be 60°). Turns of 180, 135, 100, 75, 55, 40 and 30 degrees will be used. All one need remember is that the turns will be made in this order. Place the black diamond on the 180° index of plate 21 and the red diamond on the reciprocal, North. Upon crossing the beam, a standard rate turn of 180° is made to the left of 60 seconds' duration. When in the beam again, turn right to 135° for 45 seconds. The red and the black diamonds are moved respectively to indicate the last bracket limit. When the Off-Course signal is heard, turn left 100° to 35°. (The time for a standard rate turn is found by dividing the degree of turn, on the outer scale of disc 11, by three.) With the beam intercepted, a right turn of 75° is made, the heading indicated is 105°. Off-Course, turn left 55°, the heading 50°; On-Course, turn right 40° to the heading of 90°. Off-Course, turn left 30° and the beam is found at 60°.

Example IX.—Radio Bearing Procedure—ADF

Before a course may be flown, the aircraft station relationship must be known. This problem can be solved quite readily on the computer.

To start, the arrow at the zero index of disc 11 is placed opposite the black diamond. Then, rotate both to agree with the compass heading of the aircraft. Place the inner red diamond opposite the automatic direction finder reading on the inner compass rose of disc 11. At the outer scale and the outer red diamond, read the heading to the station; at the opposite side, read the heading from the station to the aircraft.

Example X.—Predetermined Headings

After establishing the position of the aircraft in relation to the station, move the black diamond to the course or predetermined heading to be flown. (To increase the bearing, the station must be on the right; to decrease, on the left.) Turn the arrow at least 30° away from the station. The course will have been intercepted when the bearing indicator of the aircraft and the bearing indicated by the black radial on the inner red compass rose are the same number of degrees. The arrow is now moved the number of degrees indicated on the outer scale of disc 11 to the heading indicated at the black diamond. The problem can be solved without difficulty in the aircraft with the use of the headings obtained on the computer.

Example XI.—Drift Corrections and Homing on a Known Beam Tracking

When the indicator needle of the automatic radio compass is at zero, the aircraft is headed toward the radio station to which the receiver is tuned. The gyro heading of the aircraft will be the bearing to the station. With this heading held constant, the effect of a crosswind will be to drift the aircraft to one side or the other of this bearing toward the station. With the gyro heading held constant, drift will become apparent by the movement of the indicator needle away from center. When a distinct change in the bearing is observed, turn the aircraft at least 20° into the wind and hold this heading till the bearing indicator reads 20° on the downwind side. The bearing toward the station will again be intercepted. Then, turn back 10° toward the original gyro heading. If the bearing remains constant, the correction for wind has been made; if not, repeat the process in the direction of drift.

This problem can be solved quite readily on the computer.

*Example.*—The gyro heading of the aircraft is 50° and bearing indicator, 0°. After flying some time, the bearing indicator moves to 350°, which indicates a left crosswind. With the black diamond on the original heading, 50°, the arrow is turned 20° on the outer scale of disc 11. The bearing to the station will be intercepted when the black radial and the red compass rose indicate 20°. If the arrow were turned to the original heading at the black diamond, we would have returned to the original course, but without wind correction; therefore, a turn of 10° is made, allowing for a 10° wind correction. The gyro heading would indicate 40° and the bearing indicator needle, 10°.

Example XII.—Making Good a Track Away From the Station

After passing the station, the known gyro heading is flown toward the objective. The radio compass will indicate 180°. Maintain the gyro heading and note which way the indicator moves. If it should decrease, the wind is from the right. The aircraft should then be turned 20° toward the needle and the same procedure followed as correction for wind on the homing or predetermined heading.

This problem can be solved quite readily on the computer.

*Example.*—The gyro heading of the aircraft is 50°. The bearing indicator is at the 180° index of the red compass dial. A short time later, the indicator moves to the 170° index. This indicates a right crosswind. With the black diamond on the original heading, 50°, the arrow is turned 20° on the outer scale of disc 11, toward the wind. The track from the station will be intercepted when the black radial indicates 160° on the red compass rose. If the aircraft were turned to the original heading at the black diamond, we would have returned to the original course, but without wind correction; therefore, a turn of 10° is made to allow for a 10° wind. The correct gyro heading would be 60° and the bearing indicator, 170°.

Example XIII.—*Time and Distance*

After the station-and-aircraft relationship has been determined, the aircraft is turned to obtain a right-angle bearing. This heading is held until a bearing change is observed. With the application of simple mathematics and the following formula, we may find the distance to the station by dividing the airspeed by the bearing change degrees per minute. The time to the station may be found by dividing 60 by the bearing change degrees per minute. With the computer, this problem may be solved quite readily.

*Example.*—The airspeed is 120; the bearing change is 5° per minute and the course being flown is 30°. Upon completion of the time-distance problem, it is desired to return to the original track. With the red diamond and the black diamond at the 30° index of the base plate, rotate the arrow 90° to the right to the 120° index. Move the red diamond to indicate a 5° bearing change on the red compass dial (265°). The time to the station is 12 minutes and the distance is 24 miles. To return to the track of 30° indicated by the black diamond, rotate the arrow until it is 20° past the red diamond, a turn of 115° to the left or 38 seconds at a standard rate turn. The track of 30° will be intercepted when the black radial indicates 25° on the red compass rose. With a turn to the right of 25°, or 8 seconds, the airplane will be back on the track of 30°.

Example XIV.—*Manually Rotated Loop*

The procedure used is identical to that of the automatic direction finder. By solving the problem on the computer and setting the loop at the values obtained, one may track and intercept with almost the ease of the automatic direction finder.

Example XV.—*VOR (Omni-Range) Navigation Intercepting a Track or Predetermined Heading*

The track or heading to be made good is set on the course selector. The aircraft is turned to the angle of interception. When the indicator becomes centered, the course has been intercepted. The aircraft is now turned to the desired track or predetermined heading. Since all VOR problems are directional, the headings and courses will be found on the compass rose of plate 21.

*Example.*—The aircraft is flying a heading of 55° and the course to be intercepted is 220° and the angle of interception will be 45°. With the red diamond placed at the 220° index of plate 21, rotate the black diamond to the 220° index. The arrow is rotated until the desired angle of interception on disc 11 is indicated at the black radial. When the course has been intercepted, the deviation pointer (red diamond) will be centered. The aircraft is then turned the degree of interception to the course indicated at the black diamond.

Example XVI.—*VOR (Omni-Range) Navigation Drift Correction on a Track or Predetermined Heading To Be Made Good*

Maintaining the gyro heading, note the movement of the deviation indicator. Turn the aircraft 20° toward the indicator and hold this heading until the indicator becomes centered. At this point, remove half the correction or 10°. Maintain the same setting on the course selector. The gyro heading will be changed 10° into the wind. If this correction is insufficient, the process may be repeated. (NOTE.—The aircraft is considered on course when the deviation indicator is centered.)

*Example.*—The course selector is at 360° and the deviation indicator centered. The arrow indicating the course made good is at 360°. The red and black diamonds and the arrow are all placed at the 360° index of plate 21. The deviation indicator (red diamond) moves left to indicate a left crosswind. With the black diamond set at the course to be made good, 360°, rotate the arrow 20° into the wind. When the deviation indicator becomes centered, the course has been intercepted and half the correction is then removed. The red diamond of the computer is comparable to the deviation indicator of the Omni-Set, the black diamond, the course selector and the arrow, the heading of the airplane.

Example XVII.—*VOR (Omni-Range) Navigation Time-Distance*

Having determined the aircraft-and-station relationship, the aircraft is turned to obtain a right-angle bearing. Holding this heading for a minute, the course selector is rotated to center the deviation indicator and the bearing change is noted. With the following formulas, we may find the distance to the station by dividing the airspeed by the bearing change degrees per minute and the time to the station may be found by dividing 60 by the bearing change degrees per minute. Return the course selector to the track to be made good. Turn the aircraft 20° into the needle. The deviation indicator will center when on course.

The computer is used to solve the above problem.

*Example.*—The airspeed is 120, bearing change 5° per minute and the course is 30°. After the time and distance have been found, it is desirous to return to the original track. With the black and red diamonds and the arrow at the 30° index on the compass of plate 21, rotate the arrow until the 90° index of the outer scale of disc 11 is lined with the black radial. The head of the arrow indicates the heading to turn to 120°. A 5° bearing change per minute is received. The time out is 12 minutes, the distance 24 miles. To return to the track of 30° indicated by the black diamond, rotate the arrow until it is 20° past the red diamond at .005°, 38 seconds. With the course selector returned to the 30° index, the original track of 30° will be intercepted and the aircraft turned to the right 8 seconds and the 30° heading.

The foregoing description is merely intended to illustrate an embodiment of the invention. The component parts have been shown and described. They each may have substitutes which may perform a substantially similar function; such substitutes may be known as proper substitutes for the said components and may have actually been known or invented before the present invention; these substitutes are contemplated as being within the scope of the appended claims, although they are not specifically catalogued herein.

I claim:

1. A course and bearing computer comprising a first pair of transparent members each independently rotatable about a common axis, said first pair of transparent members having a plurality of cooperative, circular scales imprinted thereon concentric with the common axis, and a second pair of transparent members each independently rotatable about said common axis, said second pair of transparent members each having imprinted thereon an axial line passing through the common axis, each said axial line extending at least to each scale on the said first pair of transparement members on opposite sides of the axis of rotation.

2. A course and bearing computer comprising a first rotatable transparent member imprinted with a pair of circular scales concentric with a common axis of rotation, and an axial marker passing through said axis, a second rotatable transparent member imprinted with a circular scale concentric with the said common axis of rotation, a third rotatable transparent member imprinted with an axial marker passing through the said common axis of rotation, and a fourth rotatable transparent member imprinted with an axial marker passing through the said common axis of rotation, the axial marker on the first transparent member extending at least to the scale on the second transparent member on opposite sides of the axis of rotation and each of the axial markers on the third and fourth transparent members respectively extending at least to each scale on the first and second transparent members on opposite sides of the axis of rotation.

3. A course and bearing computer in accordance with claim 1 and relatively thin transparent separator members between said rotatable transparent members.

4. A course and bearing computer comprising a first independently rotatable transparent member imprinted with a pair of circular scales concentric with a common axis of rotation, an axial marker on the first member extending through the said axis of rotation, each of said scales on the first member having its beginning point lying on the said axial marker extending from the axis of rotation, a second independently rotatable transparent member imprinted with a circular scale concentric with the said common axis of rotation, the axial marker on the first member extending at least to the scale on the second member on opposite sides of the axis of rotation, a third independently rotatable transparent member imprinted with an axial marker, a fourth independently rotatable transparent member imprinted with an axial marker, each axial marker on the third and fourth transparent members extending through the common axis of rotation and at least to the said scales on the first and second transparent members on opposite sides of the axis of rotation.

References Cited in the file of this patent

UNITED STATES PATENTS

| | | |
|---|---|---|
| 2,253,279 | Loew | Aug. 19, 1941 |
| 2,477,556 | Shaw | July 26, 1949 |
| 2,481,846 | King | Sept. 13, 1949 |
| 2,775,404 | Lahr | Dec. 25, 1956 |
| 2,954,162 | Parigini | Sept. 27, 1960 |

FOREIGN PATENTS

| | | |
|---|---|---|
| 14,698 | Great Britain | Sept. 18, 1889 |
| 494,252 | Great Britain | Oct. 24, 1938 |